UNITED STATES PATENT OFFICE 2,575,874

PRODUCTION OF OIL-IN-OIL EMULSIONS

Anders Herlow, Grindsted, Denmark, assignor to A/S Grindstedvaerket, Grindsted, Denmark, a firm No Drawing. Application August 6, 1947, Serial No. 766,881. In Denmark September 15, 1941

Section 1, Public Law 690, August 8, 1946
Patent expires September 15, 1961

20 Claims. (Cl. 99—118)

The present invention relates to the production of emulsions of a special type consisting of particles of oil or fat or oil-like or fat-like substances dispersed in a continuous phase of similar substances. The continuous as well as the dipersed phase may be present in the liquid or in the solid state and may consist of oil or fat of vegetable or animal origin, or oil-like, fat-like or wax-like substances as mineral oil, lubricating oil, lubricating grease or mixtures of such substances. The material for the dispersed phase may be essentially the same as the material for the continuous phase or it may be more or less divergent, e. g. in regard to consistency or melting point. Even if the dispersed phase consists of a material which, at least within a certain interval of temperature, can be dissolved in or mixed with the continuous phase, the system still does not form a simple solution or mixture but is distinguished in different ways from the latter, e. g. from the simple dispersions obtained by crystallisation of fat mixtures. Thus a crystallized fat mixture when melted will immediately form a single homogeneous phase whereas the emulsions the production of which form the subject matter of the present invention do not do so. Of greater importance is generally that emulsions of the kind produced in accordance with the present invention and simple mixtures even when prepared from exactly the same raw materials, differ considerably in physical characteristics. The differences can take different courses depending on the choice of the easiest or hardest flowing or meltable component for the disperse phase, and thus the invention offers rich possibilities for variations in the consistency of mixtures of materials of said type. The emulsions also differ from the simple mixtures in that at least when the dispersed phase is a liquid one, they can be coagulated by suitable influence while a similar change cannot be obtained in case of simple mixtures. This and other conditions specific to emulsions, of which examples will be given hereinafter must presumably be explained by the phases being mutually separated by an interface layer.

Butter has turned out to be an example of an emulsion that contains particles of fat or oil surrounded by an interfacial layer and dispersed in the continuous fatty phase. In the case of butter there is also dispersed an aqueous phase in the same continuous phase but the present invention relates to the production of emulsions of the oil-in-oil-type irrespective of whether other phases than the oil phase be dispersed in the continuous phase and naturally one, two or more dispersed oil phases may be present.

The special qualities connected with such emulsions can be utilized in different technical fields. Thus these emulsions can be used, e. g. in the lubricating oil or grease industry, a lubricating material being dispersed in a fatty carrier and transported by said carrier in the dispersed condition to the surface to be lubricated, where it is rendered available by the dispersion, being caused to coagulate e. g. under the influence of friction, pressure, or heat. It is thus possible to produce a lubricating grease containing an easy flowing lubricating material in the dispersed state or vice versa a lubricating oil containing heavy flowing or semi-solid lubricating matter in emulsified condition. It is also possible to use the invention in the food or similar industry, a simple example which is also particularly important being the margarine industry partly because the particular consistency of butter in comparison with common margarine is more or less connected with the fact that the fatty phase of butter contains emulsified fat of a higher melting point which is not the case with the fatty phase of the margarine; and partly because the same circumstance affects the taste of the margarine considerably. Another example is fat containing emulsions of the type used in bakery either in the same way as margarine or for special purposes, e. g. as separating or lubricating agent or as shortening agent. For these purposes water-in-oil-emulsions of different contents of water have already been used but the use of emulsions containing water and emulsified in an emulsion of the oil-in-oil-type, presents essential advantages. It is thus possible when using high contents of high melting fats in the emulsion to avoid the bread acquiring a tallowy taste, the high melting fats being able to enter as a dispersed phase. Furthermore the adjustment of the consistency which is possible in case of such emulsions, has importance for bakery purposes. At temperatures exceeding the melting point of the lowest melting fat as well as at temperatures also exceeding the melting point of the highest melting fat, these emulsions have higher viscosity.

It was early considered that the special consistency of butter may be due to the fact that butter is produced from an emulsion of the oil-in-water-type through changing the phases, and it has therefore been proposed to produce margarine of improved consistency by primarily producing a more or less concentrated emulsion of the oil-in-water-type and subjecting the same afterwards to churning. However the results obtained in this way so far have not justified the considerable additional work caused by the rather complicated method and it can not even be supposed that the product obtained in this manner is an emulsion of the oil-in-oil-type.

One object of the present invention is a method of producing emulsions of the type oil-in-oil, which includes oil-in-oil-emulsions containing also an aqueous phase by means of which method emulsions of the desired kind can be obtained with certainty. For this purpose an oil phase that has to be dispersed in another oil phase is divided into separate particles by emulsifying it in the presence of an emulsifier and an aqueous phase and the divided oil phase is introduced into a continuous oil phase as particles dispersed therein.

There are two ways, in which the particles, into which the oil phase has been divided, can be introduced into a continuous oil phase. The first way is similar to the above named known method of producing margarine except that in the aqueous phase there is not only emulsified the oil phase that by subsequent change of phases has to be changed to form the continuous oil phase, but also one or more oil phases different from these, which are intended not to take part in the change of phases, but be maintained in the dispersed form and thus form one or more dispersed oil phases in the continuous oil phase formed by change of phases carried out with respect to the former oil phase. In other words the oil phase that has to be dispersed in another oil phase is divided into separate particles by emulsifying it in the presence of an emulsifier and an aqueous phase and in the same aqueous phase there is introduced other emulsified oil particles representing the oil intended to form the continuous oil phase, after which a reversion of phases is caused as far as the latter oil phase is concerned. The formation of an emulsion of the oil-in-oil-type thus depends on the difference of the two oil phases. This difference may consist in a difference in melting point of the two oil phases, the oil phase intended to form the one that has to be dispersed in the other oil phase having a higher melting point than the latter one or it may depend upon the emulsifying and stabilising agents used for producing the former emulsion being more resistant to influences causing the state of emulsion to reverse, methods of carrying the invention into effect so that not only the oil intended to form the oil phase dispersed in another oil phase but also the oil intended to form the continuous phase in the emulsion are emulsified in an aqueous phase which is then partially reversed, form one object of the present invention.

The other method, in which the oil phase intended to form the one dispersed in another oil phase can be introduced into the oil phase intended to form the continuous phase is by first preparing an emulsion of the oil to form the dispersed phase or the dispersed phases in an aqueous phase and then emulsify this emulsion in the oil intended to form the continuous phase. This manner of accomplishing the introduction of the dispersed oil phase into the continuous oil phase forms another object of the present invention. Further objects of the invention are formed by various steps which can be taken and conditions which may be fulfilled in order to secure that ultimately an emulsion of the desired type will be obtained. Further objects and purposes of the invention will appear from the detailed description and from the claims.

It appears from what has been said above that the basic idea of the present invention is that the oil which is intended to form the disperse phase of the oil-in-oil-emulsion is divided into separate particles by emulsifying it in the presence of an emulsifier and an aqueous phase. The emulsifying agent in this first part of the process serves to separate the oil from the aqueous phase whereas in the ultimate emulsion it serves the purpose of separating the dispersed oil phase from the continuous oil phase. I have found that emulsifying agents capable of promoting the formation of emulsions of the type oil-in-water as well as emulsions of the type water-in-oil are well suited for solving the latter problem and since they are capable of promoting the formation of emulsions of the type oil-in-water they will also be suited for promoting the formation of the primary emulsion.

It is known that some emulsifying agents are able to support the formation of one of these types of emulsions only. Thus, for instance, sodium soaps and triethanolamine stearate are examples of emulsifiers so highly hydrophilic that in most cases it is practically impossible to use them for supporting the formation of emulsions of the water-in-oil-type whereas emulsifiers of the type known as "Palsgaard" oil are typical for those emulsifiers which are able to support the formation of emulsions of the water-in-oil-type only. Diglycerol fatty acid esters are also examples of emulsifying agents supporting the formation of emulsions of the water-in-oil-type while monoglycerol fatty acid esters are more hydrophilic and therefore although they can be used for the preparation of water-in-oil-emulsions advantageously under certain circumstances can be used for the preparation of emulsions of the oil-in-water-type. As typical examples of emulsifying agents that can be used for supporting the formation of emulsions of either one or the other type can be mentioned the mono esters of diglycerol, triglycerol or polyglycerol and a fatty acid. Therefore such emulsifying agents are well adapted for use in connection with the present invention.

The hydrophilic qualities of an emulsifying agent that is otherwise not suitable for supporting the formation of either oil-in-water or water-in-oil-emulsions, can be strengthened as required by different means without the emulsifying agent thereby becoming so hydrophilic that it can be used for the preparation of oil-in-water-emulsions only. It is thus possible to introduce hydrophilic groups into an emulsifying agent that contains fatty acid groups or higher alcohol groups for the lipophillic part of the molecule, not only by combining said groups with a polyvalent alcohol, for instance glycerol in which two hydroxy groups are thereby left free, or with an alcohol containing alkoxy radicals as di-, tri- or polyglycerol, leaving also in this case alcohol hydroxyl groups free, or with glycol or polyglycol or a sugar such as glucose leaving alcohol hydroxyl groups free to a suitable extent, but it is also possible in other ways to introduce hydrophilic groups of various kinds, either into the lipophillic part of the molecule of the emulsifying agent, as for instance by oxidizing double bonds if such bonds are contained therein, or in the other part of the molecule irrespective of whether this is an alcohol or an acid or a radical connected otherwise than by esterification with the lipophile part of the emulsifying agent.

The use of such emulsifying agents for dividing the oil phase which it is intended to make the inner oil phase, into separate particles by emulsifying it in the presence of an aqueous phase and the said emulsifying agent is one manner in which proper conditions for ultimately obtaining an emulsion of the desired character can be produced. This condition appears to be an almost necessary one but perhaps the result can be obtained even when such an emulsifier capable of promoting the formation of emulsions of the type oil-in-water as well as emulsions of the type water-in-oil can not be used, namely in the case when other conditions are very much in favor of maintaining intact the particles of the oil intended to be the inner oil phase when introduced into a continuous phase. Such conditions may be that the oil phase intended to be the inner oil phase has a comparatively very high melting point whereas the other oil phase has a comparatively low melting point and the introduction of the inner oil phase into the outer oil phase be carried out at a temperature not much above the melting point of the outer oil phase. The inner oil phase will then be too hard and brittle to undergo reversion of phases and the result aimed at may be obtained even though an emulsifier capable of producing both kinds of emulsions has not been used. Another condition favorable to keeping the oil phase intended to be the inner one intact is the employment of a stabiliser capable of producing a very tough pellicule round the particles of the inner oil phase. Such a stabiliser may consist of gelatine or alginate and it must be added to the emulsion of the oil phase intended to be the inner one before the same is brought together with the oil phase intended to be the outer one so that the stabiliser has been firmly adsorbed by the emulsified particles. A third possibility is to use for the emulsifier of the oil phase intended to be the inner one, an emulsifier which by some treatments carried out afterwards will be capable of promoting the formation of both types of emulsions. It is well known that certain well known emulsifiers are actually altered from being emulsifiers for the formation of oil-in-water-emulsions to emulsifiers promoting the formation of water-in-oil-emulsions by the addition of some electrolyte. Thus sodium soaps will promote the formation of oil-in-water-emulsions whereas when calcium salts are added they will be converted into calcium soaps which promote the formation of water-in-oil-emulsions. By suitably regulating or controlling the concentration of the chemical used, an emulsifier capable of promoting both kinds of emulsions can be obtained from an emulsifier, which originally was only suited for promoting the formation of oil-in-water-emulsions.

The emulsifier used for introducing the particles of the oil phase intended to be the inner one into the oil phase intended to be the outer one must be of the kind promoting the formation of water-in-oil-emulsions if the process is carried out in the manner that the primary oil-in-water-emulsion of the former oil phase is emulsified in a continuous oil phase. In this case the latter emulsified, will normally be dissolved in the continuous oil phase.

In case the process is carried out in the manner that both oil phases are carried into a common aqueous phase in the state of emulsified particles, after which one of the oil phases is reversed, the emulsifier used for emulsifying the oil phase intended to be the continuous one in the ultimate emulsion must also be of the kind promoting the formation of both kinds of emulsions. The reversion may then be brought about by different means. One of these means is that the emulsifier used for emulsifying the oil phase intended to be the outer one is one which is more adapted to form an emulsion of the kind water-in-oil than an emulsion of the kind oil-in-water. In this case by continuing the addition of the oil phase intended to be the continuous one the emulsion will partially reverse at a certain concentration of this oil phase. In order to prevent with certainty reversal of the other oil phase, some of the means mentioned above must be resorted to i. e. the oil phase intended to be the disperse one must have a high melting point so that it is at the temperature at which the reversion takes place or the particles of it must be surrounded by a firm pellicule of a stabiliser. The process may also be carried out in such a manner that the reversion will not immediately take place by continuing the addition of the oil phase intended to be the continuous one in the ultimate emulsion, but that the oil phase added will also emulsify as disperse oil particles in the aqueous phase. The partial reversion must then be brought about by other means, f. inst. agitation, freezing or the addition of a reversion chemical. Also in such cases it is necessary that the oil phase intended to be the continuous one in the ultimate emulsion must be easier to reverse than the emulsion of the oil phase intended to be the disperse one.

If it is desirable to give the dispersed oil or fat globules a predetermined size, this can be done for instance by pressing the fat or the oil that is to form the dispersed oil or fat phase in the final emulsion out into the aqueous phase through a orifice with openings of predetermined size. There may also be cases where it is desirable that the globules in the dispersed phase have varying sizes and this is obtained by giving the holes of the mouthpiece different diameters, or by dispersing one part of the oil phase through one mouthpiece and another part through another. The ratio of the quantity of globules of one size to the quantity of those of the other size can also be approximately predetermined and maintained in this manner.

When producing margarine it will in some cases be natural to choose the diameter of the dispersed fat globules the same size as the diameter of milk fat globules.

From what has been said above it is evident how important it is that the aqueous emulsion of the oil phase intended to be the disperse one in the ultimate emulsion does not reverse. On the other hand it has been found that particularly when the invention is used in connection with the production of a product of the margarine industry, f. inst. margarine and baking emulsions (shortenings), the concentration of the oil phase dispersed in oil must be high, viz. at least 20% in order to obtain an improvement of consistency in the finished product. For this purpose the initial emulsion of the phase to be the disperse oil phase in the ultimate emulsion must have a rather considerable concentration, in most cases 50–60%. It is not an easy task to produce an emulsion of the oil-in-water-type having such high concentration, which will withstand the further treatment without reversion. It if reverses, f. inst. when introduced into the oil phase to form the continuous oil phase in the final emulsion, the result will be an emulsion the continuous oil phase of which is a simple mixture of the two oil phases and not an emulsion which is of the type oil-in-oil. This task can be accomplished by using good emulsifiers; but if they are not capable of promoting also the formation of emulsions of the type water-in-oil, they will retain the water and thus they will not form an emulsion of the type oil-in-oil with water dispersed therein, except in particular cases where a very intimate treatment is possible or where a very strong water-in-oil-emulsifier can be used for their introduction into the oil of the outer phase. This will only be the case when there is a very great difference in melting point of the two oil phases or where a very strong film can be produced on the surface of the particles of the oil phase intended to be the inner one without a similar film being formed around the particles of the other oil phase.

Therefore when difficulties of that kind arise it is well to have still another resource.

In order to avoid these difficulties according to the present invention therefore the primary emulsion of the oil phase intended to be the inner one in the ultimate emulsion is first emulsified to produce an oil-in-water-emulsion of less concentration than 50% and subsequently concentrated by centrifugal action and finally introduced into the continuous oil phase.

The reason why this manner of carrying the invention into effect is particularly important in the case of margarine and similar edible emulsions is that such emulsions are often to be produced with a water content of not more than f. inst. 16%.

Before giving definite examples of the manner in which these methods are used in actual manufacture, some general remarks as to the advantages obtained when using the invention to produce margarine and margarine-like emulsions will be given.

Said method has, in connection with the production of margarine, furthermore the advantage that it is possible to use a higher percentage of higher hardened marine oils without the taste of the margarine being reduced or the consistency being too hard or fatty.

Furthermore the distribution of brown substances when frying margarine produced according to the present invention, is better than in the case of other margarine. This can probably be explained by the fact that the fat-free dry materials are here more finely distributed through the whole emulsion being distributed in the interfacial layer around the dispersed oil phase or phases besides being distributed in the dispersed aqueous phase.

In the following, for the purpose of illustrating the invention, there will be described the method of producing margarine in two ways in which firstly, is produced a primary emulsion of the oil-in-water-type whereupon the primary emulsion is emulsified in the continuous oil phase. The invention however is not limited thereto or to said method of emulsifying.

In the following, there will be given some examples of how the invention is carried into effect which examples are non-limiting since it will be obvious to those skilled in the art of emulsion production how various changes can be made and how experiences used in one example can be made use of in connection with the other examples or into the production of other similar emulsions in which similar results are sought, but other materials and precautions are used.

Example 1

In a mixing vessel are mixed
35 kilos water,
15 kilos acidified skim-milk,
1 kilo milk-powder,
1,5 kilos diglycerol monostearate,
0,5 kilo lecithin, and
0.025 kilo 3% solution of diacetyl.

The whole mixture is sent through a circulation pipe in which is inserted an emulsifying pump and recirculated back to the vessel to be sure that the milk-powder and the emulsifier is evenly distributed.

After this the batch of high melting fat which is to form the dispersed phase in the final emulsion, is introduced through a conduit entering the circulation pipe just before the emulsifying pump. During the addition the mixture is constantly circulated through the circulation pipe and the fat is added so slowly that as long as possible there is more than 50% water in the mixture going to the pump.

Behind the pump in the circulation pipe a jet is inserted the openings sizes of which are selected in accordance with the maximum particle size desired in the emulsion.

The batch of high melting fat may be composed of 20 kilos cocoa-nut fat and 20 kilos hardened cocoa-nut fat, melting point 38–40° C. and 10 kilos hardened whale oil, melting point 40–42° C. Furthermore 100 grams butter color and 500 grams vitamin solution are included.

The batch of fat is in the melted state when added and has a temperature of about 40° C. while the aqueous mixture has an initial temperature of about 15° C. The temperature of the oil-in-water-emulsion formed is about 30° and thus below the solidification point of the batch of fat used. The point where the fat is added is chosen so that the fat does not solidify before it has been emulsified and has passed the jet. The emulsion is thereby further stabilised as an oil-in-water-emulsion, some of the formed fat globules being entirely solidified when towards the end of the process the percentage of fat is so high that possibility exists for a partial change into water-in-oil emulsion.

The formed emulsion is then emulsified in an oil mixture consisting of 9 kilos sesame oil, 90 kilos peanut oil, 75 kilos cocoa-nut fat, 25 kilos whale oil, hardened to 40/42° C., 400 grams butter color and 2 kilos vitamin solution.

During the emulsifying the temperature of this oil mixture is kept below the melting point of the batch of fat present in the primary emulsion, e. g., at 33° C. The formed solution contains the batch of high melting fats and the aqueous phase emulsified in the batch of lower melting fats, however so that the dispersed water droplets contain some dispersed fat globules.

For the sake of comparison an emulsion of the water-in-oil-type is prepared in usual manner from the same raw materials. The margarine prepared according to the example proves to be considerably better in consistency, being easier to spread on bread and being better able to keep the shape in the packages, just as it feels more like butter to the taste.

Example 2

In connection with this margarine not less than 38% of the batch of fat used as dispersed phase emulsified in the rest of the fat. The composition of the dispersed oil phase is:

70 kilos cocoa-nut fat,
40 kilos hardened cocoa-nut fat melting point 40–42°,
30 kilos hardened whale oil melting point 40–42°,
200 grams butter color, and
1,4 kilos vitamin solution.

This oil mixture is emulsified in the same manner as in Example 1 in an aqueous phase consisting of 66 kilos water and 30 kilos acidified skim-milk with which 2 kilos milk-powder, 2 kilos soy lecithin and 2 kilos diglycerol monostearate is admixed.

The primary emulsion obtained, of the oil-in-water-type, is emulsified in a batch of fat consisting of 18 kilos sesame oil, 200 kilos peanut oil, 102 kilos cocoa-nut fat, 40 kilos hardened whale oil, melting point 40–42°, 720 gs. butter color and 3,6 kilos vitamin solution.

To the last mentioned batch of fat is added an emulsifying agent for emulsions of the water-in-oil-type and for that purpose a mixture of two parts monoglycerol stearate and 1 part of soy oil oxidized and polymerized until gelatination begins, can be used. This emulsifying agent is most appropriately used in a quantity of about 1 kilo.

The emulsion formed is of the character stated in Example 1.

Comparison with a control margarine with the same total composition but prepared as a common emulsion of the water-in-oil-type shows that the margarine produced according to this example has essentially better qualities among other things being soft and spreadable even at 10° C. whereas the control margarine is hard and brittle at this temperature.

*Example 3*

In the same manner as in Example 1 a margarine is produced with two dispersed fat phases each making up 10% of the total amount of fat. The continuous phase has the same composition as in Example 1. The same applies to one of the internal phases while the other one has a somewhat higher melting point containing 10% more hardened whale oil, melting point 40/42° and 10% less unhardened cocoa-nut fat.

Even the margarine produced in this way spreads better on bread as compared with the control margarine referred to in Example 1.

An outstanding characteristic for the margarine produced according to the Examples 1, 2, and 3 is that in all three cases it feels less "cold" in the mouth than margarine produced in the manner hitherto usual. This can certainly be explained by this that the dispersed fat phase on account of its higher content of fat or on account of the interphase film surrounding the particles, does not melt or only partly melts in the mouth. As the high melting phase is found as fat globules that are easily dispersed in the saliva of the mouth, it is not felt as a covering of high melting fat even if its melting point is higher than the body temperature.

*Example 4*

As an example of the use of the method when preparing a bakery emulsion usable for rolling purposes the following is given:

100 parts of hardened whale oil 40/42° or of another fat with a similar melting point and 5 parts of glycerol monopalmitate are melted and emulsified at 50–60° in a mixture of 75 parts of acidified skim-milk and
200 parts of water in which is dissolved
40 parts of glucose,
1 part of soy lecithin and
1 part liquid egg yolk.

The glucose can be replaced by other kinds of sugar and the quantity can be raised as desired for the formation of a saturated solution even as this ingredient can be used in arbitrarily less quantities or dispersed with.

The solution obtained which is of the oil-in-water-type is cooled under continued emulsifying and when the temperature has decreased to about 35°, it is quickly emulsified in a mixture consisting of 55 parts of neutral lard,
65 parts of premier jus,
15 parts of sheabutter,
35 parts of hardened whale oil 50/52°,
142 parts of hardened whale oil 40/42°, and
88 parts of peanut oil to which is added an emulsifying agent consisting of polymerized soy oil tetraglyceride and melted and adjusted in temperature to 50°. During the emulsifying the temperature is kept in the interval of about 38–42°.

The finished emulsion that in an oil phase contains a dispersed oil as well as a dispersed aqueous phase and in the latter furthermore a dispersed oil phase, if so desired, can be cooled on a cooling drum, kneaded, mixed, etc.

*Example 5*

A butter-containing emulsion of similar character can be produced in the following manner.

10 kilos tallow is emulsified in 2.75 kilos water containing 0.5 kilo milk powder by means of ½ kilo emulsifying agent for oil-in-water-emulsion. The emulsification is carried out at 75° after which the emulsion is cooled down to about 33° under continued emulsifying.

The formed emulsion is thereafter emulsified in a mixture of 10 kilos tallow, 50 kilos butter and 3.75 kilos of an emulsifying agent for water-in-oil-emulsions which mixture is previously melted and adjusted to the temperature of 45°.

*Example 6*

An emulsion suitable for use in the bakery as so-called "nipping fat" can be produced by using the following mixture for the outer phase in the above mentioned Example 4.

70 parts soy oil,
30 parts of hardened whale oil 40/42°,
5 parts of emulsifying agent for water-in-oil-emulsions.

In this is emulsified an emulsion of:

20 parts of hardened whale oil,
5 parts of emulsifying agent for oil-in-water-emulsions, and
50 parts of water.

By varying the melting points it is possible in similar manner to produce emulsions for use in the bakeries for stirring.

*Example 7*

0.1% monofatty acid diglycerol and 0.1% lecithin are united by melting and emulsified in five times its amount of water to form an emulsion of the type oil-in-water. In this emulsion an amount of caroteen oil corresponding to 0.2% of the final emulsion is emulsified, the caroteen oil being dissolved in ten times its weight of hardened whale oil of melting point 40–42° C. This emulsion is also of the type oil-in-water. The final emulsion is homogenized at 200 kgs. pressure per cm.², after which it is cooled in order to crystallize the oil particles completely.

The homogenized emulsion serves as a pre-emulsion, which is then together with milk and water emulsified into the fatty substances intended to form the continuous phase of the ultimate emulsion. These fats may preferably contain an emulsifier capable of promoting the formation of emulsions of the type water-in-oil, f. inst. an oxidised and polymerised triglyceride. The emulsification is carried out at a temperature below the melting point of the emulsifier mixture used for producing the primary emulsion and of the mixture of caroteen oil and fat used in the primary emulsion. After emulsification has taken place the emulsion is treated in the manner usually employed in the production of margarine including cooling and working.

Example 8

In a mixing container a mixture of the following constituents is produced:

8 kilos lecithin,
14 kilos monostearicacid diglycerol,
550 ls. of water,
250 ls. of skim milk and
125 ls. of 10% lactic acid after which the pH-value is adjusted to 4.75.

In this oil phase intended to form the inner phase is emulsified. The oil phase consists of 630 kilos hardened whale oil (M. P. 50–52°),
210 kilos soy oil and
210 kilos cocoa oil.

After the emulsification the emulsion is carried through a plate cooler in which it is cooled at a temperature below the hardening oil of the fats.

The emulsion formed is then carried through a centrifuge adjusted so that 450 kilos of aqueous phase are separated.

The concentrated emulsion is then emulsified into an oil mixture consisting of 840 kilos cocoa nut and
210 kilos soy oil.

The temperature is maintained during the emulsification at a temperature below the fat mixture of the primary emulsion.

After cooling to crystallize the fats and working, a margarine is obtained which will contain 50% of its content of fat in the internal oil phase emulsified in the remaining part of the fat. This margarine is better with respect to consistency and taste than margarine produced in the usual manner of the same fats. At lower temperature than f. inst. 12–14° C. it is substantially softer and at comparatively higher temperature f. inst. 20° C. it is substantially harder than corresponding usual margarine. When eaten it will not adhere to the walls of the mouth cavity. Moreover this margarine has good stability against heating, which is demonstrated by its capability of maintaining the brown substances produced in trying dispersed in finely divided state.

Example 9

2 charges of a liquid phase of the following composition are produced:

350 kilos water
150 kilos acidified skim-milk
10 kilos dry milk
15 kilos monostearic acid diglycerol
5 kilos lecithin and
0.25 kilo of a 3% solution of diacetyl.

The whole mixture is carried through a homogenizer.

Further two oil phases are produced, the hard one and the soft one.

The hard oil phase consists of the following ingredients:

20 kilos cocoa oil
20 kilos hardened cocoa oil (M. P. 38–40° C.)
10 kilos hardened whale oil (M. P. 40–42° C).

Butter color and vitamin solution are added if so desired.

The hard oil phase is emulsified into one portion of the aqueous phase, the fat being added at a temperature of about 40° C., the aqueous mixture being at 25° C. so that the temperature of the resulting oil-in-water-emulsion is about 30° and thus is below the solidifying point of the oil phase. The place where the oil phase is introduced into the aqueous phase is so chosen that the fat will not solidify until it has been emulsified and has passed the homogenizing head.

The emulsion is made as fine as possible by properly adjusting the homogenizing head and care is taken that the emulsion will be of the type oil-in-water. If so desired a film-forming stabilizing agent, f. inst. sodium alginate is added.

The other oil phase, the soft one, consists of 9 kilos sesame oil, 165 kilos ground nut oil, 25 kilos whale oil, hardened to 40–42° C., butter color and vitamin solution if so desired. It is emulsified into other portion of the liquid phase so as to obtain the emulsion of the oil-in-water-type.

After both phases have been emulsified in each of the two charges of the aqueous phase the resulting emulsions are mixed. The mixture is centrifuged to a content of fatty oil of about 30% and left to stand for crystallization. It is then subjected to cooling in a similar manner to cream used for the production of butter and churned in a wooden churn and worked and washed.

As a result of capability of the soft fat to become liquid or soft when subjected to the usual conditions during churning and working, the particles thereof will coagulate during churning whereas the particles of the hard emulsion which if so desired has been furthermore stabilized by the addition of the film-forming stabilizing agent, have no tendency to alter their phase. Consequently an emulsion of the desired character will be obtained.

When in the previous specification and in the following claims the word "oil" has been used it is to be understood that fats are included.

I claim:

1. The method of producing an emulsion of the type oil-in-oil in which an oil intended to form the interior oil phase is divided into separate particles by emulsification in an aqueous phase in the presence of an emulsifying agent to produce an oil-in-water emulsion and the oil-in-water emulsion thus produced is introduced into a continuous oil phase having a lower melting point than the oil in the interior phase.

2. The method of producing an emulsion of the type oil-in-oil in which the oil intended to form the interior oil phase is divided into separate particles by emulsification in an aqueous phase in the presence of an emulsifying agent to produce an oil-in-water emulsion and the oil-in-water primary emulsion thus produced is introduced into a continuous oil phase having a lower melting point than the oil in the interior phase, by directly emulsifying the primary emulsion of said particles into said continuous oil phase, the oil used for producing the primary emulsion constituting more than 20% of the total quantity.

3. The method of producing an emulsion of the type oil-in-oil in which an oil intended to form the interior oil phase is divided into separate particles by emulsification in an aqueous phase in the presence of an emulsifying agent to produce an oil-in-water emulsion and the oil-in-water primary emulsion thus produced is introduced into a continuous oil phase having a lower melting point than the oil in the interior phase by directly emulsifying the primary emulsion of said particles into said continuous oil phase to which an emulsifying agent capable of promoting the formation of emulsions of the type water-in-oil has been added, the oil used for producing the primary emulsion constituting more than 20% of the total quantity.

4. The method of producing an emulsion of the type oil-in-oil in which an oil intended to form the interior oil phase is divided into separate particles by emulsification in an aqueous phase in the presence of an emulsifying agent to produce an oil-in-water primary emulsion and the oil-in-water primary emulsion thus produced is introduced into a continuous oil phase having a lower melting point than the oil intended to form the interior oil phase by directly emulsifying the primary emulsion of the particles of the oil intended to form the interior oil phase into the said continuous oil phase containing an emulsifying agent capable of promoting the formation of emulsions of the type water-in-oil, the emulsification taking place at a temperature above the melting point of the continuous oil phase but below the melting point of the oil intended to form the interior oil phase and the oil used for producing the primary emulsion constituting more than 20% of the total quantity of oil used.

5. The method of producing an emulsion of the type oil-in-oil in which an oil intended to form the interior oil phase is divided into separate particles by emulsification in an aqueous phase in the presence of an emulsifying agent capable of promoting the formation of emulsions of the type oil-in-water as well as emulsions of the type water-in-oil and in which said emulsion is centrifuged and the particles thus produced are introduced into a continuous oil phase having a lower melting point than the oil in the interior oil phase by directly emulsifying the centrifuged emulsion of the oil intended to form the interior oil phase into the said continuous oil phase containing an emulsifying agent capable of promoting the formation of emulsions of the type water-in-oil.

6. The method of producing an emulsion of the type oil-in-oil in which an oil intended to form the interior oil phase is divided into separate particles by emulsification in an aqueous phase in the presence of an emulsifying agent and another oil is introduced in the form of an oil-in-water-type-emulsion in the emulsion thus formed and the resulting emulsion of both phases is reversed with respect to the latter oil phase, the oil intended to form the interior oil phase having a higher melting point than the melting point of the oil intended to form the continuous phase.

7. The method as set forth in claim 1 in which the emulsifying agent is a mono fat acid ester of a polyglyceride.

8. The method as set forth in claim 1 in which the emulsifying agent is diglycerol monostearate.

9. A margarine forming an emulsion of the type oil-in-oil comprising an aqueous phase carrying an emulsifying agent and an interior oil phase as dispersed particles, in a continuous oil phase having a lower melting point than the oil forming the interior phase.

10. A margarine as set forth in claim 9 in which the oil in the interior phase constitutes more than 20% of the total oil present.

11. A margarine as set forth in claim 10 in which the continuous oil phase carries an emulsifying agent capable of promoting the formation of emulsions of the type water-in-oil.

12. A margarine as set forth in claim 9 in which the continuous oil phase carries an emulsifying agent capable of promoting the formation of emulsions of the type water-in-oil.

13. A shortening forming an emulsion of the type oil-in-oil comprising an aqueous phase carrying an emulsifying agent and an interior oil phase as dispersed particles, in a continuous oil phase having a lower melting point than the oil forming the interior phase.

14. A shortening as set forth in claim 13 in which the oil in the interior phase constitutes more than 20% of the total oil present.

15. A shortening as set forth in claim 14 in which the continuous oil phase carries an emulsifying agent capable of promoting the formation of emulsions of the type water-in-oil.

16. A shortening as set forth in claim 13 in which the continuous oil phase carries an emulsifying agent capable of promoting the formation of emulsions of the type water-in-oil.

17. A margarine as set forth in claim 9 in which the emulsifying agent is a mono fat acid ester of a polyglyceride.

18. A margarine as set forth in claim 9 in which the emulsifying agent is diglycerol monostearate.

19. A shortening as set forth in claim 13 in which the emulsifying agent is a mono fat acid ester of a polyglyceride.

20. A shortening as set forth in claim 13 in which the emulsifying agent is diglycerol monostearate.

ANDERS HERLOW.

REFERENCES CITED

The following references are of record in the file of this patent:

UNITED STATES PATENTS

| Number | Name | Date |
| --- | --- | --- |
| Re. 19,425 | Harris | Jan. 15, 1935 |
| 1,710,403 | Chamberlin | Apr. 23, 1929 |
| 2,325,393 | Green | July 27, 1943 |
| 2,422,633 | Petersen | June 17, 1947 |